Patented Jan. 8, 1924.

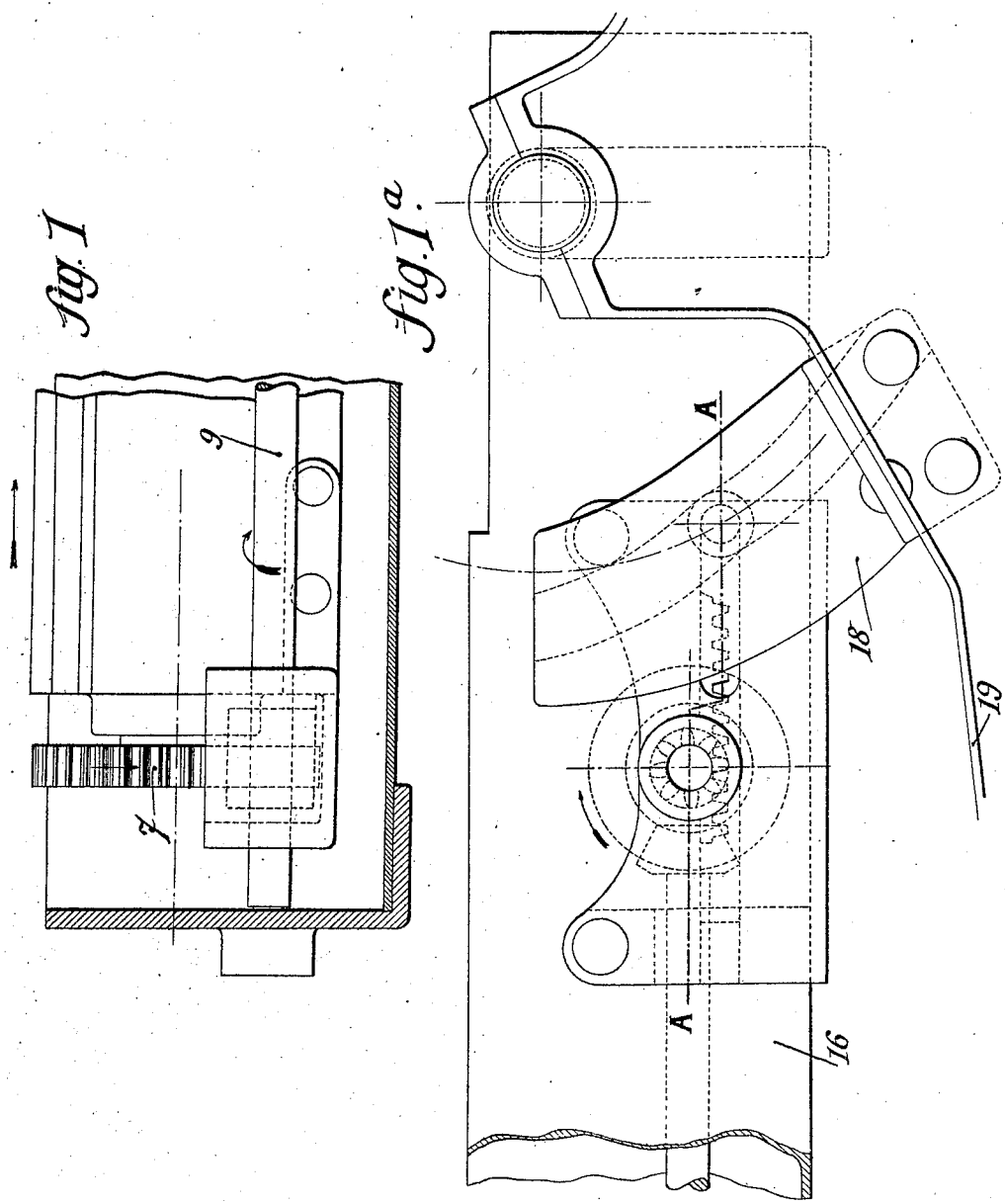

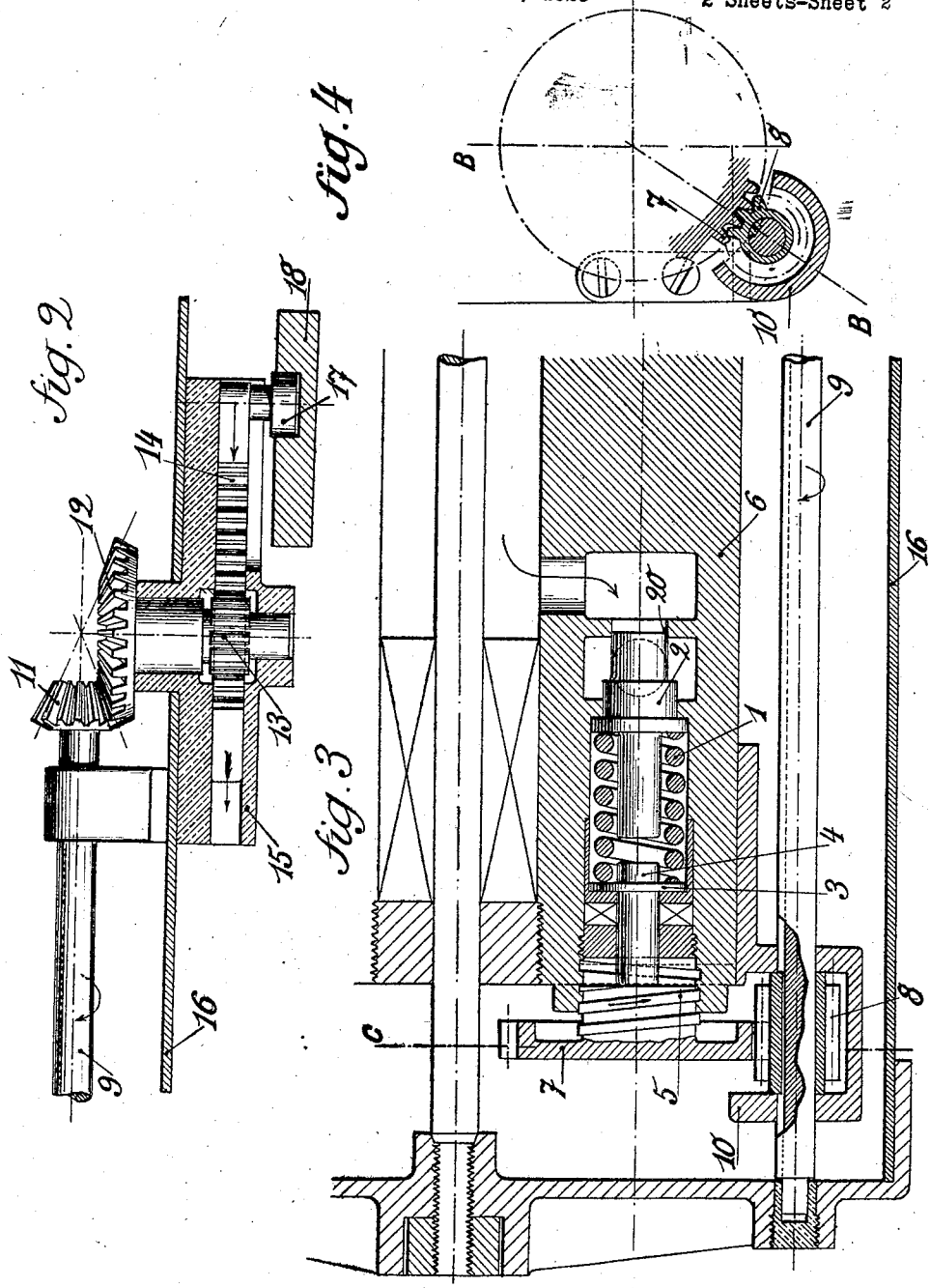

1,480,468

UNITED STATES PATENT OFFICE.

EMILE RIMAILHO, OF PARIS, FRANCE, ASSIGNOR TO COMPAGNIE DES FORGES & ACIERIES DE LA MARINE & D'HOMECOURT, OF PARIS, FRANCE.

REGULATOR FOR THE OUTLET OF LIQUID IN ARTILLERY BRAKES.

Application filed October 2, 1923. Serial No. 666,145.

*To all whom it may concern:*

Be it known that I, EMILE RIMAILHO, a citizen of the Republic of France, and residing at Paris, Seine Department, No. 12 Rue de la Rochefoucauld, in the Republic of France, engineer, have invented certain new and useful Improved Regulators for the Outlet of Liquid in Artillery Brakes, of which the following is a specification.

It has already been proposed to utilize various devices for regulating the outlet of liquid in artillery brakes in which the adjustment of the recoil is effected by means of a valve which is constantly urged by a weak spring, and the amount of lift of said valve is preferably limited in accordance with the firing angles by a stop-rod controlled by a set of inclined planes, the said device being characterized by the use of a second spring or like elastic means disposed between said stop-rod and the set of inclined planes, so that the small pressures of the flow of liquid produced by the weak spring shall be replaced by high pressures produced by the great tension of the second spring, this latter tension being obtained for instance by means of inclined planes.

In the present invention, the regulating arrangement is applied to a brake which recoils together with the cannon after the shot is fired.

The appended drawings which are given by way of example shew a constructional form of a regulating device in accordance with the present invention.

Figs. 1 and 1ª are a partial elevation of the cannon, with parts of the sheet metal cradle broken away.

Fig. 2 is a partial horizontal section on the line A—A of Fig. 1.

Figs. 3 and 4 shew details of the device.

Fig. 3 is a horizontal section on the line B—B of Fig. 4.

Fig. 4 is a vertical section on the line C—C of Fig. 3.

The said regulating device comprises a spring 1, Fig. 3, bearing at one end upon the valve 2 and at the other upon the flange 3 of the stop-rod 4.

The said stop rod which is adapted to limit the amount of lift of said valve according to the firing angles, may be outwardly impelled by a screw 5 revoluble in a nut which forms part of the brake body 6. The rotation of said screw which is secured to a gear wheel 7 is obtained by a driving device consisting of an actuating pinion 8 which is keyed to but longitudinally slidable upon said shaft throughout the whole stroke of the brake.

The pinion 8 is secured to the brake during the motion of the latter by means of a pinion guide 10 attached to the main body of the brake.

The driving shaft is rotated by means of the bevel gears 11, 12 which are actuated by the pinion 13 and the rack 14.

The said rack which is slidable in a support 15 secured to the left hand face of the cradle 16 is provided at one end with a stud 17 engaging a slot in the cam 18, said cam being attached to the carriage 19.

When the cannon with the cradle is aimed at an angle $\alpha$, the stud of the rack 17 is obliged to move according to the profile of the cam 18, thereby rotating the pinions 12, 11 of the driving shaft 9, the pinion 10 and the gear wheel 7 of the regulating screw 5; this produces the forward movement of the stop-rod 4 towards the valve 2, thus more or less reducing the amount of the valve lift and thereby diminishing the outlet orifice 20; for a given energy of recoil, this will have the effect of reducing the length of the recoil according as the angle is greater.

It should be observed that this increase of pressure per square centimetre can be obtained not only by varying the cross-section of the orifice as above stated, but also by the use of the following arrangement.

The spring of the valve 1, instead of being made preferably weak, is on the contrary so chosen that it may be subjected to a high initial tension.

With a powerful spring thus arranged, it is simply necessary to select for the various lengths of recoil to be obtained according to the firing angles, the initial tensions which are suitable for producing the pressure per square centimeter corresponding to the recoil strokes, and to provide suitable proportions for the rotating elements and the pitch of the regulating screw, in order that the forward motion of the latter when aiming the gun shall subject the spring to the said initial tensions.

In this event the pressure will be substantially constant in the brake during the whole of the recoil stroke, and it will vary solely in the ratio of the initial tension of the spring to its final tension when the said valve is lifted.

It should be observed that the said method of regulating the recoil stroke by varying the initial tension of the spring may be employed alone or in combination with the use of the said stop-rod.

Claims:

1. A regulating device for the outlet of liquid in an artillery brake adapted to recoil with the cannon in a cradle pivoted to the carriage when the shot is fired, comprising a throttling valve disposed upon the brake, a spring serving to close the said valve, a stop-rod limiting the lift of said valve, a shaft disposed in the cradle and situated parallel with the direction of sliding of the cannon and brake, controlling means slidable upon said shaft and adapted to impel the said stop-rod to a greater or less degree towards the said valve, and suitable mechanism for rotating the said shaft in accordance with the inclination of the cannon in its carriage.

2. A regulating device for the outlet of liquid in an artillery brake adapted to recoil with the cannon in a cradle pivoted to the carriage when the shot is fired, comprising a throttling valve disposed upon the brake, a spring serving to close the said valve, a stop-rod limiting the lift of said valve, a shaft disposed in the cradle and situated parallel with the direction of sliding of the cannon and brake, controlling means slidable upon said shaft and adapted to impel the said stop-rod to a greater or less degree towards the said valve, and suitable mechanism for rotating the said shaft in accordance with the inclination of the cannon to the carriage, said mechanism comprising a cam secured to the carriage, a slidable rack guided upon the cradle and co-operating with said cam, and gearing operatively connecting said rack with the said shaft.

3. A regulating device for the outlet of liquid in an artillery brake adapted to recoil with the cannon in a cradle pivoted to the carriage when the shot is fired, comprising a throttling valve disposed upon the brake, a spring serving to close the said valve, a shaft disposed in the cradle and situated parallel with the direction of sliding of the cannon and brake controlling means slidable upon said shaft and adapted to impel the said spring against the said valve, said spring having a sufficient strength to balance pressure exercised upon the valve by the liquid during the recoil, and a mechanism for rotating the said shaft in accordance with the inclination of the cannon upon its carriage.

4. A regulating device for the outlet of liquid in an artillery brake adapted to recoil with the cannon in a cradle pivoted to the carriage when the shot is fired, comprising a throttling valve disposed upon the brake, a spring serving to close the said valve, a stop-rod limiting the lift of said valve, a nut disposed upon the brake, a screw turning therein and adapted to impel the said stop-rod towards the said valve, and controlling means for rotating the said screw in accordance with the pivoting movements of the cannon upon its carriage, said means being adapted to operate independently of the sliding of the cannon in its carriage.

In testimony, that I claim the foregoing as my invention, I have signed my name in presence of a subscribing witness.

EMILE RIMAILHO.

Witness:
MAURICE ROUX.